United States Patent
Marino et al.

(10) Patent No.: US 10,880,494 B2
(45) Date of Patent: *Dec. 29, 2020

(54) REMOTE CONTROL ACTIVITY DETECTION

(71) Applicant: Caavo Inc, Milpitas, CA (US)

(72) Inventors: Nino Vincenzo Marino, Alameda, CA (US); Andrew E. Einaudi, San Francisco, CA (US); Ashish Dharmpal Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,797

(22) Filed: Dec. 3, 2018

(65) Prior Publication Data

US 2019/0104256 A1    Apr. 4, 2019

Related U.S. Application Data

(63) Continuation of application No. 15/727,340, filed on Oct. 6, 2017, now Pat. No. 10,158,810.

(60) Provisional application No. 62/405,526, filed on Oct. 7, 2016.

(51) Int. Cl.
| | |
|---|---|
| *H04N 5/268* | (2006.01) |
| *H04N 21/422* | (2011.01) |
| *H04N 21/443* | (2011.01) |
| *G08C 17/00* | (2006.01) |
| *G08C 17/02* | (2006.01) |
| *H04N 21/41* | (2011.01) |
| *H04N 21/4363* | (2011.01) |
| *H04N 21/442* | (2011.01) |
| *H04N 21/436* | (2011.01) |

(52) U.S. Cl.
CPC ............. *H04N 5/268* (2013.01); *G08C 17/00* (2013.01); *G08C 17/02* (2013.01); *H04N 21/4131* (2013.01); *H04N 21/42204* (2013.01); *H04N 21/42221* (2013.01); *H04N 21/42226* (2013.01); *H04N 21/43615* (2013.01); *H04N 21/43635* (2013.01); *H04N 21/4432* (2013.01); *H04N 21/44227* (2013.01)

(58) Field of Classification Search
CPC ..................... H04N 5/268; H04N 21/42204
USPC ....................................................... 348/734
See application file for complete search history.

(56) References Cited

U.S. PATENT DOCUMENTS

| | | |
|---|---|---|
| 9,749,552 B2 | 8/2017 | Gopinath et al. |
| 9,860,360 B2 * | 1/2018 | Shinar ............... H04M 1/72533 |
| 10,158,810 B2 | 12/2018 | Marino et al. |
| 10,454,703 B2 * | 10/2019 | Shinar ............... H04M 1/72533 |

(Continued)

*Primary Examiner* — Paulos M Natnael
(74) *Attorney, Agent, or Firm* — Fiala & Weaver P.L.L.C.

(57) ABSTRACT

Embodiments described herein enable detection of remote control activity. For example, a determination may be made whether an RF remote control is in use by detecting a non-RF signal transmitted by the RF remote control. The non-RF signal need not actually control any device, but it may be used to detect when the RF remote control is in use. An AV switch may detect an RF remote control is in use by detecting a non-RF signal. For example, when a user uses an RF remote (e.g., to control an STB with an RF signal) the use may be detected by detecting a non-RF (e.g., an IR signal) signal and the AV switch may use the detection, for example, to control a TV (e.g., turn on), control the switch (e.g., port selection for a TV to display STB output) and/or other devices.

20 Claims, 8 Drawing Sheets

(56) References Cited

U.S. PATENT DOCUMENTS

| | | |
|---|---|---|
| 2002/0125998 A1 | 9/2002 | Petite et al. |
| 2005/0117910 A1 | 6/2005 | Foote et al. |
| 2005/0254524 A1 | 11/2005 | An et al. |
| 2007/0220150 A1 | 9/2007 | Garg |
| 2007/0292135 A1* | 12/2007 | Guo .................. H04B 10/1143 398/106 |
| 2009/0207319 A1 | 8/2009 | Satoh et al. |
| 2009/0219174 A1 | 9/2009 | Kikuchi et al. |
| 2010/0315997 A1 | 12/2010 | Kim et al. |
| 2011/0161660 A1 | 6/2011 | Zhang et al. |
| 2012/0062805 A1 | 3/2012 | Candelore |
| 2012/0075538 A1 | 3/2012 | Okuda |
| 2013/0057774 A1 | 3/2013 | Yoshida et al. |
| 2013/0219420 A1 | 8/2013 | Candelore |
| 2013/0236007 A1* | 9/2013 | Munro .................. H04L 9/0861 380/44 |
| 2014/0334795 A1* | 11/2014 | Dobrowolski ... H04N 21/42204 386/234 |
| 2016/0140075 A1 | 5/2016 | Kashyap et al. |
| 2016/0162015 A1 | 6/2016 | Moon |
| 2017/0142249 A1* | 5/2017 | Shinar ................ H04M 1/72533 |
| 2017/0230727 A1 | 8/2017 | Meuninck et al. |
| 2018/0068415 A1 | 3/2018 | Meuninck et al. |
| 2018/0103211 A1* | 4/2018 | Marino .................. G08C 17/00 |
| 2018/0123818 A1* | 5/2018 | Shinar .................. H04L 12/282 |
| 2018/0315303 A1* | 11/2018 | Durai .................... G08C 23/04 |

* cited by examiner

REMOTE CONTROL ACTIVITY DETECTION

CROSS-REFERENCE TO RELATED APPLICATIONS

This application is a continuation of U.S. patent application Ser. No. 15/727,340, filed on Oct. 6, 2017, which claims priority to Provisional U.S. Patent Application No. 62/405,526, filed on Oct. 7, 2016, the entireties of which are incorporated by reference herein.

BACKGROUND

Technical Field

The present invention relates to methods, systems, and apparatuses for remote control activity detection.

Background Art

A typical home entertainment system may consist of a variety of different multimedia devices, such as a television (TV), a cable/satellite set-top box (STB), video game consoles such as Xbox™ or Playstation™, media streaming devices, such as Roku™, AppleTV™, Chromecast™, and a host of other devices, such as Blu-ray™ players, digital video disc (DVD) and compact disc (CD) players. Very often, these devices are connected through an audio-video receiver (AVR). A user's interaction with these devices can be classified into four distinct set of operations: (1) initial setup; (2) switching sources and control of devices; (3) accessing and controlling content playback; and (4) reconfiguration of the system when devices are added or removed.

The initial setup of multimedia devices not only includes wiring and connections, which can be quite intimidating, but also involves setting up a myriad of options in each of the devices. The crow's nest of wires makes it extremely difficult to trace back the connections in case one needs to make any changes. Furthermore, High-Definition Multimedia Interface (HDMI) interfaces require a user to identify which HDMI ports are input ports and which HDMI ports are output ports, thereby making setup even more complicated. Moreover, many TVs today are installed on the wall, which makes finding and reaching HDMI ports on the back of such TVs extremely difficult, let alone aligning the right cable so that it can be inserted into the port properly.

Once devices are connected, it becomes quite difficult to remember which device is connected to which port. Thus, switching between devices accurately becomes quite a struggle. For example, if a user wants to switch to a video game console, the user has to remember the port to which the game console is connected. As described above, devices, such as TVs and AVRs, require HDMI ports to be manually configured using menu options to identify which device is connected to which port. However, this option is quite cumbersome and seldom performed by the user.

In addition, the TV and AVR remote controls are difficult to use, but are essential to control the devices and other functions. For example, the TV or AVR remote control is required for selecting a particular device and other operations, such as volume control. However, due to the limited functionality of the TV or AVR remote control, the user needs to find and operate the device's remote control to start controlling the device (e.g., play, pause, stop, etc.). Thereafter, if the user decides to watch a program on the cable STB, he has to once again find the TV remote, remember which port the set-top box was connected to, switch to that port, and then operate the STB remote control and use it to control the device.

BRIEF SUMMARY

Methods, systems, and apparatuses are described for remote control activity detection, which may be utilized, for example, in the control of home entertainment devices and other connected devices, such as home automation equipment, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements.

Figure 1:
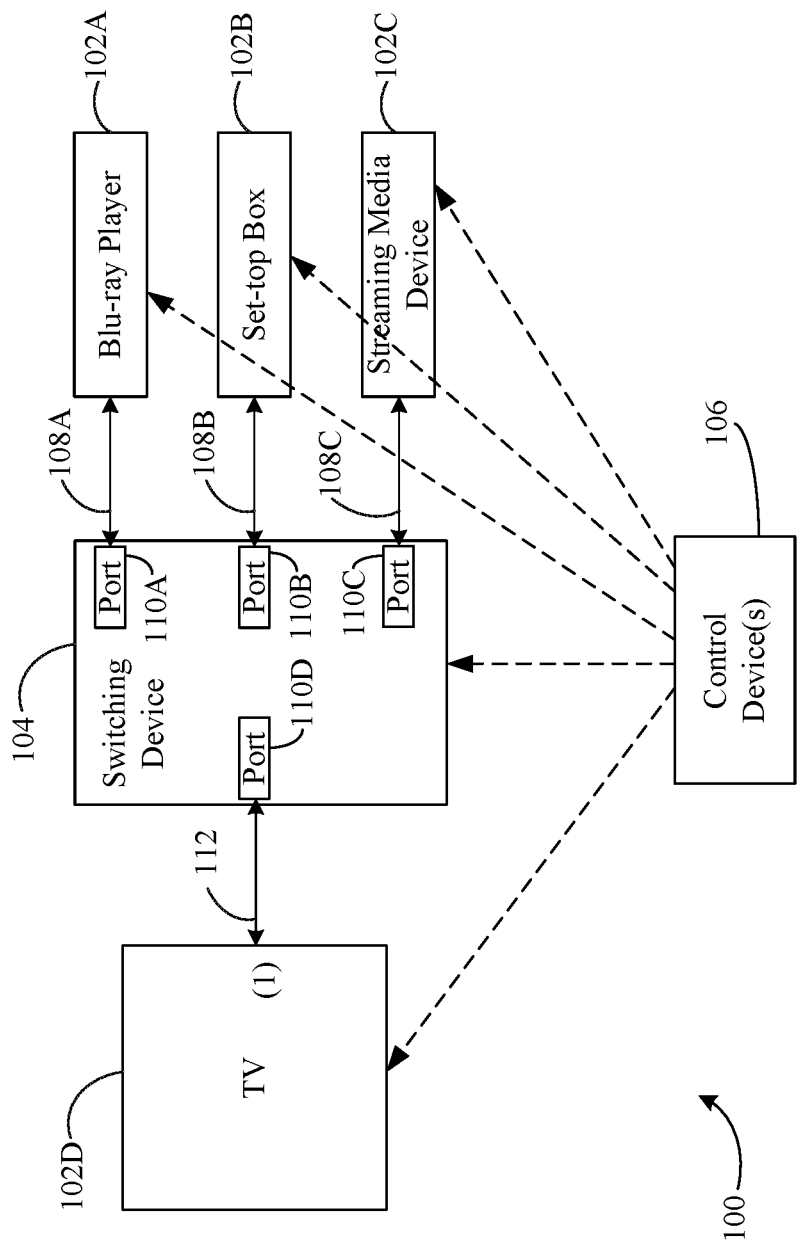
FIG. 1 is a block diagram of a system that is configured to automatically set up and control a plurality of electronic devices and the content provided thereby and/or played back thereon in accordance with an embodiment.

Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

A method is described herein that may be performed by a switching device that is operable to connect one or more source devices to one or more sink devices. The method may comprise detecting a non-RF signal transmitted by an RF remote control device that is operable to control a first device among the one or more source devices or one or more sink devices, wherein the RF remote control device is programmed to transmit the non-RF signal in response to a user interaction with the RF remote control device. In further accordance with the method, in response to the detection of the non-RF signal, it is determined that the RF remote control device is in use. In response to determining that the remote RF control device is in use, the switching device controls a connection between one of the one or more source devices and one of the one or more sink devices, one of the one or more source devices, one of the one or more sink devices, or a second device that is not one of the one or more source devices or one or more sink devices.

In accordance with one or more embodiments, the non-RF signal comprises a device identification code that indicates to one of the one or more source devices or one of the one or more sink devices that the non-RF signal should be ignored.

In accordance with one or more embodiments, controlling the one of the one or more source devices or the one of the one or more sink devices comprises powering on or powering off one of the one or more source devices or one of the one or more sink devices.

In accordance with one or more embodiments, controlling the second device comprises controlling one of a light, a window shade, a projection screen, a thermostat, a smart phone, or a surround sound system.

In accordance with one or more embodiments, the non-RF signal carries a device identification code that indicates to the switching device that the non-RF signal should be not be ignored.

In accordance with one or more embodiments, the non-RF signal comprises an infrared (IR) signal.

In accordance with one or more embodiments, the switching device comprises an audio/video switch, the one of the one or more of source devices comprises a set-top-box, and the one of the one or more sink devices comprises a television.

A switching device is also described herein. The switching device includes a plurality of audio/video (AV) ports, a receiver, and control logic that is operable to selectively connect any one of one or more source devices, each of which is connected to a corresponding one of the plurality of AV ports, to one or more sink devices, each of which is connected to another corresponding one of the plurality of AV ports. The control logic is configured to determine that the receiver has received a non-RF signal transmitted by an RF remote control device that is operable to control a first device among the one or more source devices or one or more sink devices, wherein the RF remote control device is programmed to transmit the non-RF signal in response to a user interaction with the RF remote control device. In response to determining that the receiver has received the non-RF signal, the control logic is further configured to determine that the RF remote control device is in use. In response to at least determining that the RF remote control device is in use, the control logic is further configured to identify a source device that is associated with the RF remote control device from among the one or more source devices, identify a first AV port from among the plurality of AV ports to which the identified source device is connected, and automatically connect the first AV port to the one or more AV ports to which the one or more sink devices are connected so that content can be provided from the identified source device to the one or more sink devices.

In accordance with one or more embodiments, the control logic is further configured to identify a source device from among the one or more source devices that is associated with the RF remote control device by detecting a device identification code included in the non-RF signal that identifies the source device and associating the device identification code included in the non-RF signal with the source device.

In accordance with one or more embodiments, the switching device further comprises user interface logic that is configured to prompt a user to program the RF remote control device to include the device identification code in the non-RF signal.

In accordance with one or more embodiments, the control logic is further configured to determine that the receiver has received a second non-RF signal transmitted by a second RF remote control device that is operable to control a second device among the one or more source devices or one or more sink devices, wherein the second RF remote control device is programmed to transmit the second non-RF signal in response to a user interaction with the second RF remote control device. In response to determining that the receiver has received the second non-RF signal, the control logic is further configured to determine that the second RF remote control device is in use. In response to at least determining that the second RF remote control device is in use, the control logic is further configured to identify a second source device that is associated with the second RF remote control device from among the plurality of source devices, identify a second AV port from among the plurality of AV ports to which the identified second source device is connected, and automatically connect the second AV port to the one or more AV ports to which the one or more sink device are connected so that content can be provided from the identified second source device to the one or more sink devices.

In accordance with one or more embodiments, the non-RF signal comprises an IR signal.

In accordance with one or more embodiments, the plurality of AV ports are High-Definition Multimedia Interface (HDMI) ports.

In accordance with one or more embodiments, the control logic is further configured to, in response to determining that the RF remote control device is in use, transmit a control signal that causes one of the one or more source devices or one of the one or more sink devices to be powered on or powered off.

A first device is also disclosed herein. The first device includes a receiver, a transmitter, and control logic that is connected to the receiver and the transmitter and is operable to selectively control a second device. The control logic is configured to determine that the receiver has received a non-RF signal transmitted by an RF remote control device that is operable to control a third device, wherein the RF remote control device is programmed to transmit the non-RF signal in response to a user interaction with the RF remote control device. In response to determining that the receiver has received the non-RF signal, the control logic is further configured to determine that the RF remote control device is in use. In response to determining that the RF remote control device is in use, the control logic is further configured to automatically transmit a control signal to the second device via the transmitter.

In accordance with one or more embodiments, the non-RF signal comprises a device identification code that indicates to the second device that the non-RF signal should be ignored.

In accordance with one or more embodiments, the non-RF signal comprises an IR signal.

In accordance with one or more embodiments, the control signal transmitted to the second device comprises a signal to power on or power off the second device.

In accordance with one or more embodiments, the first device further comprises user interface logic that is configured to prompt a user to program the RF remote control device to include a device identification code in the non-RF signal.

In accordance with one or more embodiments, the second device comprises a sink device, a source device, a light, a window shade, a projection screen, a thermostat, a smart phone, or a surround sound system.

Example Embodiments

Example embodiments described herein enable a switching device to automatically select one or more AV ports that are coupled to one or more electronic devices that a user would like to use to watch and/or listen to content. The AV port(s) may be automatically selected based on determining that an RF remote control device is being used. Upon determining that an RF remote control device is being used, a source device for providing content is identified from among a plurality of source devices. Thereafter, an AV port from among a plurality of AV ports to which the identified source device is connected is identified. The identified AV port is then selected so that the identified source device becomes connected to one or more AV ports to which one or more sink devices are connected. In this way, the switching device can provide content from the identified source device to the sink device for playback.

In another embodiment, upon determining that an RF remote control device is being used, a source device from among a plurality of source devices or a sink device from among a plurality of sink devices is controlled, for example, by powering on or powering off the source or sink device. In another embodiment, upon determining that an RF remote control device is being used, another device that is neither a source nor a sink device is controlled, such as an electronic device or a home automation device. In this manner, a switching device may automatically control one or more additional devices upon detecting that an RF remote control device is being used.

FIG. 1 is a block diagram of a system 100 that is configured to automatically setup and control a plurality of electronic devices 102A-102D and content provided thereby and/or played back thereon. As shown in FIG. 1, system 100 includes electronic devices 102A-102D, a switching device 104, and one or more control device(s) 106.

Electronic devices 102A-102C are configured to provide audio and/or video signals (e.g., audio and/or video signals 108A, 108B, 108C, respectively) for playback and are referred to as "source" devices. Electronic device 102D is configured to receive audio and/or video signals (e.g., audio and/or video signals 112) and is referred to as a "sink" device. As shown in FIG. 1, electronic device 102A is coupled to a first AV port 110A of switching device 104, electronic device 102B is coupled to a second AV port 110B of switching device 104, electronic device 102C is coupled to a third AV port 110C of switching device 104, and electronic device 102D is coupled to a fourth AV port 110D of switching device 104. In accordance with an embodiment, AV ports 110A-110D are High Definition Media Interface (HDMI) ports. However, embodiments described herein are not so limited. As further shown in FIG. 1, electronic device 102A is a Blu-ray player, electronic device 102B is a set-top box (STB), electronic device 102C is a streaming media device, and electronic device 102D is a TV. Examples of a streaming media device include, but are not limited to, a Roku™ device, an AppleTV™ device, a Chromecast™, and/or the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of electronic devices.

Switching device 104 is configured to select (e.g., switch between) different audio and/or video source devices that are coupled to AV ports 110A-110C (e.g., electronic device 102A, electronic device 102B or electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source. Audio and/or video signals 112 are provided to electronic device 102D that is coupled to AV port 110D. Audio and/or video signals 112 may also be provided to any other device capable of playing back audio and/or video signals (e.g., speakers) that may be coupled to AV port 102D and/or other port(s) (not shown) of switching device 104.

Each of AV ports 110A-110D may be configurable to be coupled to either a source device (e.g., electronic device 102A, electronic device 102B, or electronic device 102C) or a sink device (e.g., electronic device 102D). For example, switching device 104 may be configured to automatically determine whether an electronic device coupled to a particular AV port is a source device or a sink device. Based on that determination, switching device 104 may configure that AV port to be a source AV port or a sink AV port. Additional details regarding the auto-configuration of AV ports 110A-110D is described below in Subsection A.

Switching device 104 may also be configured to automatically identify (e.g., determine) the electronic device coupled to each of AV ports 110A-110D. For example, for each electronic device coupled to a particular AV port, switching device 104 may be configured to determine one or more identifiers of the electronic device, such as, but not limited to, a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Upon determining the identifier(s), switching device 104 may be configured to map the identified electronic device to the AV port to which that electronic device is connected. This process may be referred to as "device-to-port mapping." Additional details regarding device-to-port mapping is described below in Subsection B.

Switching device 104 may be further configured to automatically select or switch between AV ports 110A-110C based on determining which electronic device(s) a user would like to use for providing and/or presenting content. For example, in accordance with an embodiment, switching device 104 is configured to automatically select one or more of AV port(s) 110A-110C based on determining that an RF remote control device is being used. For instance, if a user would like to view content from electronic device 102B (e.g., a STB), the user may interact with an RF remote control device associated with electronic device 102B. Upon the user's interaction with the RF remote control device, the remote control device may transmit an RF signal to electronic device 102B, as well as a non-RF signal that is received by switching device 104. Upon receipt of the RF or non-RF signal, switching device 104 determines that the RF remote control device associated with electronic device 102B is being used. Once this determination is made, switching device 104 may determine which AV port is coupled to electronic device 102B using the device-to-port mapping described above. After determining that electronic device 102B is connected to AV port 110B, switching device 104 may automatically select (or switch to) AV port 110B, thereby enabling electronic device 110B to provide audio and/or video signals 108B to electronic device 102D for playback. Additional details regarding automatically selecting an AV port based on determining that an RF remote control device is being used are described below in Subsection C.1.

In accordance with another embodiment, switching device 104 may be configured to automatically control one or more source devices, and one or more sink devices. For example, when a user is using an RF remote control device associated with an electronic device (e.g., electronic device 102B), switching device 104 may detect an RF or non-RF signal transmitted by the RF remote control device and thereby determine that the RF control device is being used. Upon making the determination that an RF remote control device associated with electronic device 102B is being used, switching device 104 may transmit a control signal to one or more source devices or one or more sink devices coupled to switching device 104. For instance, if switching device 104 determines that an RF control device associated with electronic device 102B is being used, switching device 104 may transmit a signal to power off electronic devices 102A and/or 102C. Switching device 104 may also determine that one or more sink devices are associated with electronic device 102B, and transmit a signal to power on each of the associated sink device(s) (e.g., electronic device 102D). Additional details regarding automatically controlling one or more source or sink devices based on an RF remote control detection are described below in Subsection C.2.

In accordance with another embodiment, switching device 104 may be configured to automatically control one or more other devices that are not source or sink devices. For instance, when a user is using an RF remote control device associated with an electronic device (e.g., electronic device 102B), switching device may detect an RF or non-RF signal transmitted by the RF remote control device and thereby determine that the RF control device is being used. Upon making the determination that an RF remote control device associated with electronic device 102B is being used, switching device 104 may transmit a control signal to one or more other devices that are not source devices or sink devices. For instance, if switching device 104 determines that an RF control device associated with electronic device 102B is being used, switching device 104 may determine that one or more other devices (e.g., such as an electronic device or a home automation device) should automatically be controlled in response. Additional details regarding automatically controlling one or more devices that is not a source or sink device based on an RF remote control detection are described below in Subsection C.3.

Control device(s) 106 may be operable to control any or all of electronic devices 102A-102D and/or switching device 104. Control device(s) 106 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). The display screen may be configured to enable a user to interact, view, search, and/or select content for viewing via any of electronic device 102A-102D and switching device 104. In embodiments, control device(s) 106 may be configured to transmit both an RF signal and a non-RF signal upon a user interaction with the control device(s). For example, the RF signal may be transmitted to any of electronic devices 102A-102D, and the non-RF signal may be transmitted to switching device 104. By transmitting the non-RF signal in addition to the RF signal, switching device 104 may determine when any one of control device(s) 106 are being used to control electronic device(s) 102A-102D. Additional details regarding one exemplary implementation of control device 106 are provided below in reference to FIG. 5.

In accordance with an embodiment, control device(s) 106 may be operable to control any or all of electronic devices 102A-102D by transmitting control signals thereto. In embodiments, the RF signal may be transmitted via any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.), and/or the like. In accordance with an embodiment, the non-RF signal may comprise, for example, an IR signal utilizing an IR protocol.

A. Automatic Configuration of AV Ports

Figure 2:
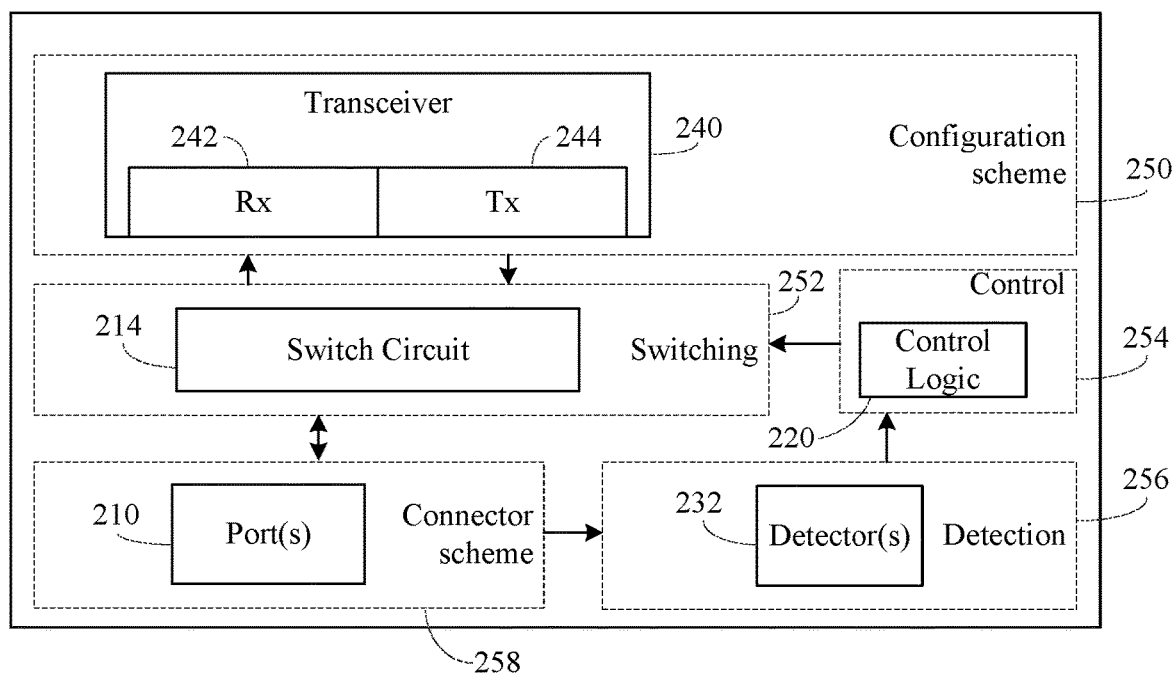
FIG. 2 is a block diagram of a switching device that is configured to automatically configure audio/video (AV) port(s) to be coupled either to a source device or a sink device in accordance with an embodiment.

FIG. 2 is a block diagram of a switching device 204 that is configured to automatically configure audio/video (AV) port(s) to be coupled either to a source device or a sink device in accordance with an embodiment. Switching device 204 may be an example of switching device 104, as described above in reference to FIG. 1. Switching device 204 may include a number of sub-schemes according to embodiments: a configuration scheme 250, a switching scheme 252, a control scheme 254, a detection scheme 256, and a connector scheme 258. According to various embodiments, the sub-schemes shown may be combined with each other, separated into multiple components, etc.

Connector scheme 258 includes one or more AV ports 210 (also referred to as AV connectors). In accordance with an embodiment, AV port(s) 210 are configured to accept HDMI connections from HDMI enabled devices, such as HDMI sink devices and HDMI source devices. According to embodiments, any AV port of AV port(s) 210 may accept a sink device or a source device. While not shown for illustrative clarity, a typical signal conditioning scheme may also be retained to meet the strict compliance requirements for the standard used to implement AV port(s) 210 (e.g., an HDMI standard in an embodiment where AV port(s) 210 are HDMI AV port(s)).

Configuration scheme 250 includes a transceiver 240 that includes an input component RX 242 and an output component TX 244. Transceiver 240 is configured to receive audio and/or video signals at input component RX 242 and to transmit audio and/or video signals from output component TX 244. In other words, transceiver 240 provides received input audio and/or video signals from source devices as output audio and/or video signals to sink devices, in accordance with the embodiments herein. It is also contemplated herein that one or more of input component RX 242 and/or an output component TX 244 may be included in transceiver 240 in various embodiments.

Detection scheme 256 may include one or more detectors 232 that are configured to detect indicia of operational modes to determine a type of an electronic device (e.g., an HDMI-enabled device) connected to AV port(s) 210 (i.e., whether the electronic device is a source or a sink). In embodiments, detectors 232 may be configured to make such a detection/determination based on signals received from AV port(s) 210.

Control scheme 254 may include control logic 220 that is configured to receive the detected indicia or signals based thereon from detectors 232 and use the received information to control one or more aspects of switching scheme 252, such as one or more switches included therein.

Switching scheme 252 includes switch circuit 214. Switch circuit 214 may be configured to provide switched connections between AV port(s) 210 and transceiver 240. That is, switch circuit 214 may provide a connection between any AV port of AV port(s) 210 and any receiver (e.g., input component RX 242) or transmitter (e.g., output component TX 244) of transceiver 240. Switch circuit 214 may comprise one or more switch circuit portions and may be combined or used in conjunction with other sub-schemes of switching device 204.

Accordingly, there is no need to pre-define the function of any port of AV port(s) 210. That is, AV port(s) 210 can be configured either as inputs or outputs. Additionally, detector(s) 232 are configured to detect the type of electronic device (i.e., a source device or a sink device) connected to an AV port of AV port(s) 210 and provide this information as input to control scheme 254, which may then issue appropriate commands to switch circuit 214 to either connect to input component RX 242 or output component TX 244 of transceiver 240. Thus, the same AV port can act as an input or an output depending on which type of electronic device is connected and considerably enhance the convenience of an interface process of switching device 204 (e.g., a process in which a user connects electronic device(s) to AV port(s) 210 of switching device 204).

Accordingly, the techniques and embodiments described herein provide for improvements in auto-detection and adaptive configuration of AV port(s), as described above. Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference.

B. Automatic Port Mapping to Connected Devices

Figure 3:
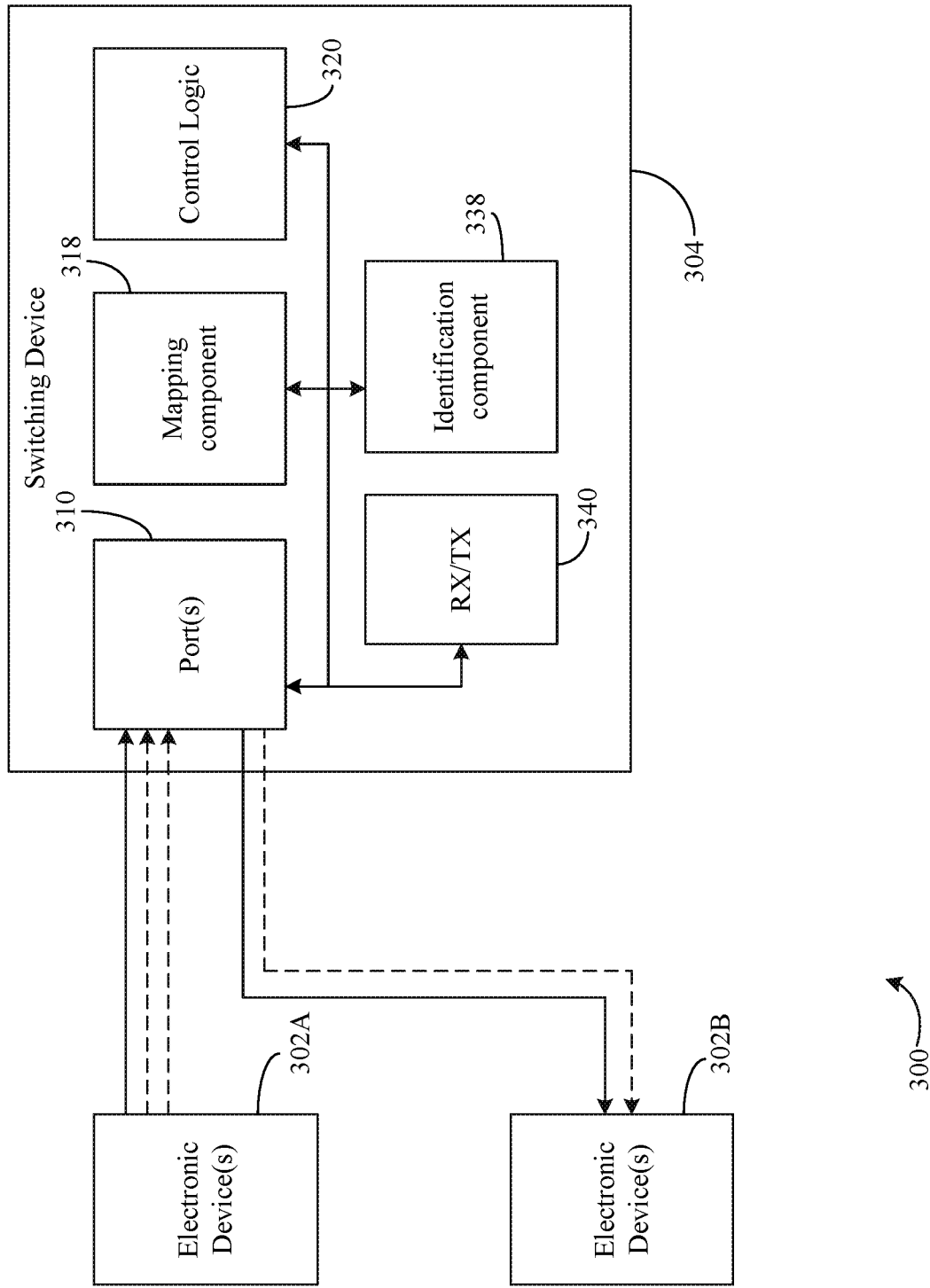
FIG. 3 is a block diagram of a switching device that is configured to automatically identify each electronic device coupled to an AV port and map each identified electronic device to the AV port in accordance with an embodiment.

FIG. 3 is a block diagram of a system 300 that is configured to automatically identify electronic device(s) coupled to AV port(s) of a switching device and map the identified electronic device(s) to the AV port(s) to which they are connected in accordance with an embodiment. As shown in FIG. 3, system 300 includes one or more electronic devices 302A, one or more electronic devices 302B and switching device 304. Electronic device(s) 302A are source devices configured to provide audio and/or video signals. Electronic device(s) 302B are sink devices configured to receive audio and/or video signals. Electronic device(s) 302A may be examples of electronic devices 102A-102C, and electronic device(s) 302B may be examples of electronic device 102D, as described above in reference to FIG. 1.

Switching device 304 may be an example of switching device 104 or switching device 204, as described above in reference to FIGS. 1 and 2, respectively. As shown in FIG. 3, switching device 304 includes AV port(s) 310, transceiver 340, mapping component 318, control logic 320 and identification component 338. Each of electronic devices 302A and 302B are coupled to an AV port of AV port(s) 310. Each of AV port(s) 310 may be automatically configured to be a source AV port or a sink AV port in a similar manner as described above in Subsection A.

Transceiver 340 may be an example of transceiver 240 as described above in reference to FIG. 2. Accordingly, transceiver 304 may be configured to receive audio and/or video signals and to transmit audio and/or video signals. In other words, transceiver 340 provides received input audio and/or video signals from source devices as output audio and/or video signals to sink devices, in accordance with the embodiments herein.

Identification component 338 may be configured to identify the electronic device (e.g., electronic device(s) 302A or 302B) coupled to each AV port of AV port(s) 310. For example, for each electronic device(s) 302A or 302B, identification component 338 may be configured to determine identifier(s) of the electronic device, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 338 provides the identifier(s) to mapping component 318.

Mapping component 318 is configured to determine a device-to-port mapping based on the identifier(s) received from identification component 338. For example, mapping component 318 may generate a data structure (e.g., a table) that associates the identifier(s) for any given identified electronic device to the AV port to which that electronic device is coupled. In this way, the device-to-port mapping may indicate that a first electronic device (e.g., a Blu-ray player) is coupled to a first AV port (e.g., AV Port 1), that a second electronic device (e.g., a STB) is coupled to a second AV port (e.g., AV Port 2), and that a third electronic device (e.g., a TV) is coupled to a third AV port (e.g., AV Port 3).

Additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

Control logic 320 may be an example of control logic 220 as described above in reference to FIG. 2. As described below in Subsection C.1, control logic 320 may be cause certain AV port(s) 310 to be automatically selected based on an identification of which of remote control device is being used and using the device-to-port mapping of mapping component 318 to identify the AV port(s) to be coupled.

C. Remote Control Activity Detection

Figure 4:
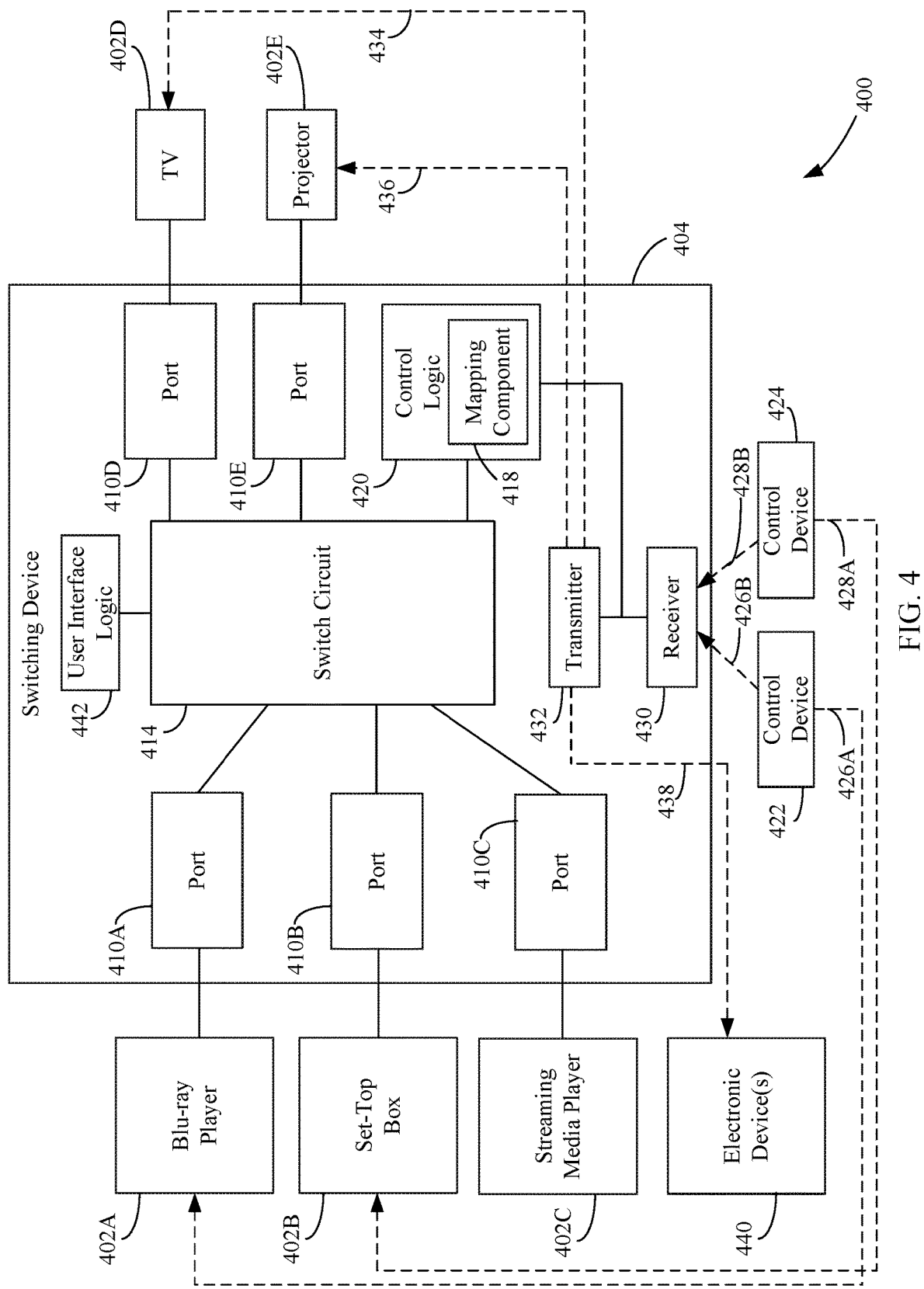
FIG. 4 is a block diagram of a system that is configured to automatically perform at least one action based on determining that a radio-frequency (RF) remote control device is being used in accordance with an embodiment.

FIG. 4 is a block diagram of a system 400 that is configured to automatically perform at least one action, such as controlling a device, based on determining that an RF remote control device is being used in accordance with an embodiment. As shown in FIG. 4, system 400 includes electronic devices 402A-402E, one or more electronic device(s) 440, a switching device 404, a first control device 422, and a second control device 424.

In the illustrative example shown in FIG. 4, electronic devices 402A-402C are source devices configured to provide audio and/or video signals. Electronic devices 402D and 402E are sink devices configured to receive audio and/or video signals. As shown in FIG. 4, electronic device 402A is a Blu-ray player, electronic device 402B is a STB, electronic device 402C is a streaming media player, electronic device 402D is a TV and electronic device 402E is a projector. The depiction of these particular electronics devices is merely for illustrative purposes. Each of electronic devices 402A-402E may be any electronic device capable of providing and/or playing back AV signals.

Switching device 404 may be an example of switching device 104, switching device 204 or switching device 304, as described above in reference to FIGS. 1-3, respectively. As shown in FIG. 4, switching device 404 includes AV ports 410A-410E, a switch circuit 414, a mapping component 418, control logic 420, a receiver 430, a transmitter 432, and user interface logic 442. As further shown in FIG. 4, electronic device 402A is coupled to AV port 410A, electronic device 402B is coupled to AV port 410B, electronic device 402C is coupled to AV port 410C, electronic device 402D is coupled to AV port 410D and electronic device 402E is coupled to AV port 410E. AV ports 410A-410C may be automatically configured to be source AV ports, and AV ports 410D and 410E may be automatically configured to be sink AV ports in a similar manner as described above in Subsection A.

Switch circuit 414 may be an example of switch circuit 214 as described above in reference to FIG. 2. Switch circuit 414 may be configured to connect a particular source AV port (e.g., AV ports 410A, 410B, or 410C) to a particular one or more sink AV ports (e.g., AV port 410D and/or AV port 410E) based on a determination that an RF remote control device (e.g., control device 422 or control device 424) is being used. As will be discussed below, a non-RF signal transmitted by control device 422 or control device 424 may be received by receiver 430 in accordance with an embodiment.

For example, control device 422 may be a RF remote control device that is configured to operate any one of electronic devices 402A-402E, and control device 424 may be an RF remote control device that is configured to operate another one of electronic device 402A-402E. Each of control device 422 and 424 may be configured to operate a particular electronic device by transmitting a control signal to that electronic device via a wireless connection (e.g., an RF communication). For illustrative purposes, control device 422 is configured to operate electronic device 402A and, thus, is shown transmitting an RF control signal 426A to electronic device 402A, and control device 424 is configured to operate electronic device 402B, and thus is shown transmitting an RF control signal 428A to electronic device 402B. It is noted that system 400 may comprise additional remote control device(s) that are operable to control other electronic device(s) (e.g., electronic device 402C, electronic device 402D, or electronic device 402E). In another embodiment, control device 422 or control device 424 may be a universal remote control that may be configured to operate a plurality of electronic devices 402A-402E, and/or any other electronic device, such as switching device 404.

Each of control device 422 and 424 may also be configured to transmit a non-RF signal control signal 426B and 428B, respectively, in addition to RF control signal 426A and RF control signal 428A. Examples of such remote controls may include, for example, remote controls commonly provided with set-top boxes (STBs), AppleTV™ remote and Universal Remote controllers that are configured to transmit both an RF and a non-RF signal. An RF remote control (e.g. control device 424) may provide remote control of devices (e.g. STB 402B) via an RF signal and control of other devices (e.g. TV 402D) via non-RF (e.g. IR) signals, which may be user-programmable.

Figure 5:
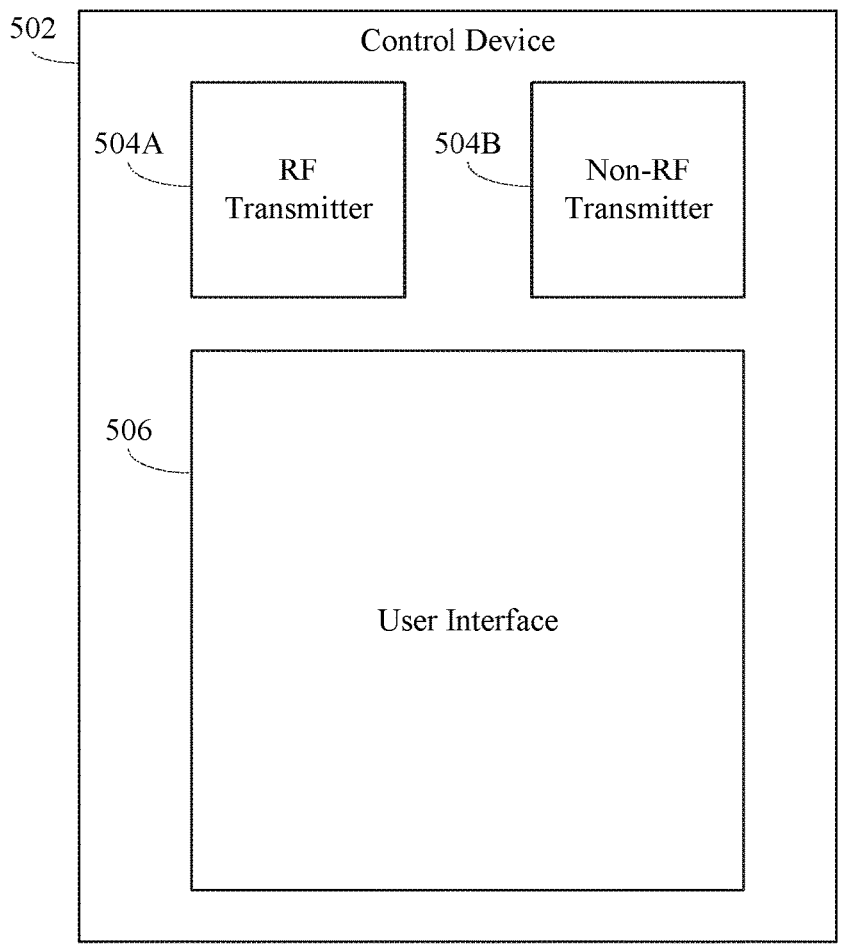
FIG. 5 is a block diagram of an RF remote control device in accordance with an embodiment.

FIG. 5 is a block diagram of an RF remote control device 502 in accordance with an embodiment. Control device 502 may be an example of control device 422 and control device 424 as described with reference to FIG. 4. As shown in FIG. 5, control device 502 comprises an RF transmitter 504A, a non-RF transmitter 504B, and a user interface 506. As an example, control device 502 may be operable to control a source device (e.g., a STB) via an RF signal using any suitable RF-based communication protocol. In response to a user interaction with user interface 506, control device 502 may transmit an RF signal via RF transmitter 504A that comprises a control signal to the source device. Control device 502 may also be programmed to emit a non-RF signal operable to control another device, such as a TV. For instance, control device 502 may be programmed with a device identification code of an electronic device, which causes non-RF transmitter 504B to emit a non-RF signal in response to a user input. In an embodiment, non-RF transmitter is an IR transmitter configured to transmit an IR signal using an IR protocol.

User interface 506 may comprise any suitable user interface, including a physical user interface, graphical user interface, voice-based user interface, or the like. For instance, user interface 506 may comprise physical interface elements, such as, but no limited to, a power button, a volume up button, a volume down button, number keys, and/or letter keys. User interface 506 may also comprise a capacitive touch display screen comprising one or more interface elements (e.g., icons, buttons, etc.). One or more of the user interface elements on user interface 506 may be activated when pressed (e.g., such interface elements may be click-sensitive), rather than simply being touched. This advantageously enables control device 502 to unambiguously determine that a user intended to activate such interface element(s) instead of accidentally touching such interface element(s). In accordance with one or more embodiments, one or more of interface elements may provide tactile feedback when activated. Actuation of any one of the user interface elements via user interface 506 may cause control device 502 to transmit an RF signal operable to control a first device via RF-transmitter 504B, and/or a non-RF signal via non-RF transmitter 504B.

Referring back to FIG. 4, receiver 430 may be configured to detect control signals 426B and 428B transmitted by control devices 422 and 424, respectively, and determine that a remote control device is being used. Control logic 420 may be further configured to detect a device identification code contained within the received non-RF signals 426B or 428B. Control logic 420 may provide the device identification code to mapping component 418, which associates each device identification code with a particular source device. In this manner, control logic 420 may determine identify which source device is being operated through receipt of a non-RF signal from a control device.

It may be advantageous to know whether a user is using a remote control (e.g. control device 422 or control device 424) to control a device, such as electronic device 402A or electronic device 402B. This knowledge may be used, for example, to perform one or more actions, such as coupling a source device to one or more sink devices, controlling one or more source or sink devices, or controlling any other electronic device that is not a source or sink device. For instance, when control device 424 is being used, it may be desired to automatically connect electronic device 402B (e.g., a STB) to electronic device 402D (e.g., a TV), such that electronic device 402D displays audio-visual information provided by electronic device 402B.

It may be difficult for switching device 404 to detect a transmission of RF signals 426A or 428A by control device 422 or control device 424, for example, when the control devices are used to control electronic device 402A or electronic device 402B. Accordingly, receiver 430 of switching device 404 may be configured to detect non-RF signals to determine when control device 422 or control device 424 is being used. Use of RF-based remote controls may be detected, for example, by detecting non-RF signals (e.g. IR signals) also transmitted by the RF remote control device.

Remote controls, e.g., including control device 422 and control device 424, may be configured to set specific makes and/or models of devices (e.g. TVs), for example, to select one or more non-RF control signals (e.g. IR signals) from remote controls to control particular devices (e.g. TVs). In an example, a user may indicate a make and/or model of a TV or other device when programming an RF remote control device capable of also transmitting a non-RF signal. The RF remote control device may look up a database of IR codes and may select one or more specific IR codes for the make and/or model of the TV entered by the user.

In another embodiment, the one or more specific IR codes may be programmed automatically by switching device 404, for example, through user interface logic 442 and one or more source devices (e.g., electronic device 402D or 402E). For instance, a user may select a specific make and/or model of a device to program the non-RF signal of one of control devices 422 or 424. In such an embodiment, switching device 404 may automatically transmit a device identification code to program the RF remote control device through any suitable communication method, including a wireless transmission (e.g., an RF transmission or IR transmission), or a wired transmission.

In an example, a TV type for a programmable RF remote control may be programmed to a known but rarely used TV type. For instance, control device 422 or 424 may be programmed to control a make/model of a TV that is not the same make/model of the TV (or any other source or sink device) coupled to switching device 404. In this manner, the non-RF signal does not directly control any source or sink device in system 400, but rather transmits a non-RF signal that contains a device identification code (e.g., for a known but rarely used TV type) that indicates to switching device 404 that the non-RF signal should not be ignored by the switching device. By purposely programming the RF remote control device (e.g., control device 422 or 424) with a device identification code corresponding to a known but rarely used TV type that is not intended to be ignored by switching device 404, switching device 404 can thereby detect when the RF remote control device is being used.

In an embodiment, control device 422 or 424 may be configured to permit a user to select the particular device identification code for which the non-RF signals of control device 422 or 424 are programmed. In this embodiment, control logic 420 may also be configured to detect non-RF signals containing the user-selected device identification code. In another embodiment, control logic 420 may be configured to detect and act on only certain predetermined device identification codes. In such an embodiment, user interface logic 442 may prompt a user to program control device 422 or 424 with one of the predetermined device identification codes, such that control logic 420, upon receiving the non-RF signal, does not ignore the non-RF signal.

In another embodiment, switching device 404 may automatically program control device 422 or 424 with a device identification code. In yet another embodiment, control device 422 or 424 may be programmed with a predetermined device identification code (e.g., from a factory, manufacturer, or retailer). In this illustrative scenario, control logic 420 may be programmed with the device identification code corresponding to control device 422 or 424, such that non-RF signals transmitted by control device 422 or 424 to receiver 430 are not ignored. In yet another embodiment, control device 422 or 424 may come preprogrammed with a device identification code corresponding to a known but rarely used TV type (or any other device identification code) for which switching device 404 is preprogrammed. In this manner, switching device 404 may already be configured not to ignore non-RF signals transmitted by control device 422 or 424, eliminating the need for additional programming.

Thus, a device identification code, such as an IR code, associated with the non-RF signals of control device 422 or 424 may be known and detectable by control logic 420. By detecting a non-RF signal comprising a known device identification code (e.g., a pre-programmed IR code), control logic 420 can automatically determine when a particular RF remote control device (e.g., a remote control associated with a STB) is being used.

In this manner, upon detecting that a particular RF remote control device is being used, switching device 404 may automatically take any one of a number of actions in response, such as controlling a port switching operation within switching device 404, controlling a source device, controlling a sink device, or controlling any other electronic device, as will be described in greater detail below.

In another embodiment, a user may, either unilaterally or when prompted through user interface logic 442, program the RF remote to transmit a non-RF signal comprising a device identification code that an electronic device (e.g., TV 402D) connected to switching device 404 does not ignore, as opposed to a device identification code corresponding to a known but rarely used TV type that the electronic device is expected to ignore. In this illustrative scenario, a smart HDMI switch (e.g., switching device 404) may nevertheless be configured not to ignore the non-RF signals. However, because the electronic device (e.g., TV 402D) is configured to act upon non-RF signals received by it, the smart HDMI switch need not transmit a control signal to the electronic device comprising a same instruction received by the electronic device via the non-RF signal. Rather, upon detection of the non-RF signal comprising the device identification code, the smart HDMI switch may perform additional non-conflicting functions, such as controlling a port switching operation within switching device 404, controlling a source device, controlling additional functions of a sink device, controlling a separate sink device, or controlling any other electronic device.

Accordingly, a switch may (e.g. based on user set up in response to prompting) or otherwise (e.g. based on knowledge of devices coupled to the switch) detect any non-RF signals that a user may setup for the RF remote to determine when the user is using the RF remote. Regardless how a switch and RF remote control device are made aware of the particular device identification code to use for the non-IR transmission indicating that the RF remote control device is being used, control logic 420 may detect the non-RF signal and switching device 404 may use the detection to react accordingly, such as by controlling power to one or more other devices (e.g. TV) and/or switching audio and/or visual (e.g. HDMI) inputs and/or outputs.

For instance, in an embodiment comprising a smart switch (e.g., switching device 404), the switch may be aware of which one or more devices an RF controller controls based on the detection of the non-RF signal. The switch may decide (e.g., based on a static and/or dynamic configuration provided by a manufacturer, user or device algorithm) to perform one or more operations upon detecting that a user is using an RF remote, such as switching the switch to particular source port (e.g., port 410B corresponding to STB 402B) upon detecting a user is using an RF remote to control an STB. The switch may also perform other operations, such as turning a TV on to display the output of the STB or other TV-related operations, such as changing a video or audio setting of the TV.

Mapping component 418 may be an example of mapping component 318 as described above in reference to FIG. 3. Mapping component 418 may be configured to identify a source device (e.g., electronic device 402A, electronic device 402B, or electronic device 402C) to be used for providing content and/or one or more sink devices (e.g., electronic device 402D or electronic device 402E) for presenting the content based on the non-RF signal detected by control logic 420. Mapping component 418 may be further configured to identify the AV port(s) to which the identified source device and/or sink device are connected (as described above in Subsection B) and provide an identifier to control logic 420 that identifies the identified AV port(s).

Control logic 420 may be an example of control logic 220 as described above in reference to FIG. 2. Based on mapping component 418 and the non-RF signal detected by control logic 420, control logic 420 may be configured to provide a control signal to switch circuit 414, which causes switch circuit 414 to connect the identified source AV port to the identified and/or determined one or more sink AV ports.

Figure 6:
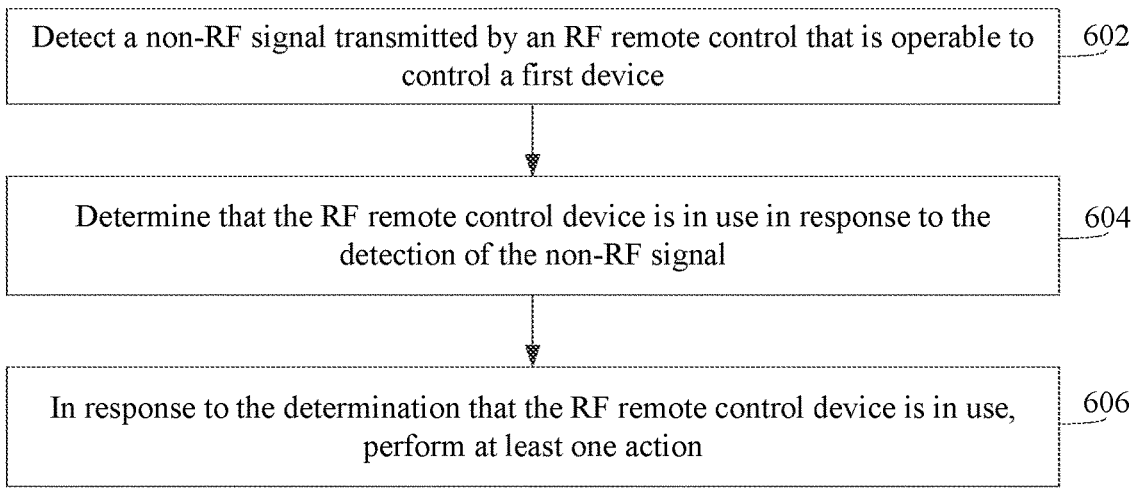
FIG. 6 depicts a flowchart of a method for performing at least one action based on a determination that an RF remote control device is being used in accordance with an embodiment.

Accordingly, in embodiments, automatically performing an action may be carried out upon determining that a particular RF remote control device is being used in many ways. For instance, FIG. 6 depicts a flowchart 600 of a method performed by a switching device that performs at least one action in response to determining that an RF remote control device is in use in accordance with an embodiment. The switching device may comprise a plurality of AV ports and a switch circuit that is operable to selectively connect any one of a plurality of source devices, each of which is connected to a corresponding one of the plurality of AV ports, to a sink device that is connected to another one of the plurality of AV ports. The switching device may also comprise a transmitter configured to emit a control signal to one or more source devices, one or more sink devices, and/or any other electronic device that is not a source or sink device. The method of flowchart 600 may be implemented by system 400 as described above in reference to FIG. 4. Other structural and operational embodiments will be apparent to persons skilled in the relevant art(s) based on the following discussion regarding flowchart 600 and system 400.

Flowchart 600 begins with step 602. At step 602, a non-RF signal transmitted by an RF remote control device operable to control a first device is detected. For example, with reference to FIG. 4, receiver 430 is configured to detect non-RF signal 426B transmitted by control device 422 or non-RF signal 428B transmitted by control device 424. In an embodiment, control device 422 is operable to control an electronic device, such as electronic device 402A (e.g., a Blu-ray player) via RF signal 426A, while control device 424 is operable to control another electronic device, such as electronic device 402B (e.g., a STB) via RF signal 428A. When a user interacts with control device 424, control device 424 may be programmed to transmit both an RF signal 428A to electronic device 402B (e.g., to power on STB 402B), as well as a non-RF signal (e.g., an IR signal) 428B to receiver 430.

In step 604, a determination is made that the RF remote control device is in use in response to the detection of the non-RF signal. For instance, with continued reference to FIG. 4, control logic 420 may determine that control device 422 or 424 is in use based on detection of non-RF signal 426B or 428B received by receiver 430. In an embodiment, control device 422 or 424 may be programmed to transmit a non-RF signal 426B or 428B comprising a device identification code. Once receiver 430 receives non-RF signal 426B or 428B (or any other non-RF signal), control logic 420 may determine whether the device identification code contained within the non-RF signal indicates whether the received non-RF signal should be ignored. For instance, non-RF signal 428B transmitted by control device 424 may comprise a device identification code for a known, but rarely used TV type. In this example, control logic 420 may be configured to detect non-RF signals containing the same device identification code (i.e., a device identification code corresponding to the same known but rarely used TV type), while ignoring other non-RF signals. As a result, when a user interacts with control device 424 causing it to transmit RF signal 428A and non-RF signal 428B, control logic 420 may determine that control device 424 is in use.

Control logic 420 is not limited to the above illustrative examples. Control logic 420 may be programmed not to ignore a plurality of device identification codes. For instance, where a system comprises a plurality control devices 422 and 424, each control device 422 and 424 may be programmed with a different device identification code. For example, control device 422 may be programmed to transmit non-RF signal 426B corresponding to a particular known but rarely used TV type, while control device 424 may be programmed to transmit non-RF signal 428B corresponding to a different known, but rarely used TV type. In this example, control logic 420 may be configured not to ignore either device identification codes. In this manner, when receiver 430 receives either non-RF signal 426B or 428B, control logic 420 may automatically determine which particular control device is being used based on the device identification code and mapping component 418, thereby also permitting control logic to determine which particular source device is being used.

In step 606, in response to determining that the RF remote control device is in use, at least one action is performed. For example, with reference to FIG. 4, control logic 420 may perform any one of a number of various actions upon determining that a particular RF remote control device is being used. For instance, control logic 420 may control a port switching operation of switching device 404 causing one of the one or more electronic devices 402A-402C (e.g., source devices) to be connected to one or more of electronic devices 402D-402E (e.g., sink devices), such that content from the selected source device is automatically displayed on the one or more sink devices. In another embodiment, control logic 420 may cause transmitter 432 to transmit a control signal to one or more of electronic devices 402A-402C (e.g., source devices) or one or more of electronic devices 402D-402E (e.g., sink devices) in response to determining that an RF remote control device is being used. In yet another embodiment, control logic 420 may cause transmitter 432 to transmit a control signal to an electronic device(s) 440, which is neither a sink or a source device coupled to switching device 404.

In yet another embodiment, control logic 420 may control any combination of the exemplary actions discussed above. For instance, upon determining that control device 422 associated with electronic device 402B (e.g., a STB) is being used, control logic 420 may cause transmitter 432 to transmit a control signal 434 to electronic device 402D (e.g., a TV) instructing electronic device 402D to power on. In addition, control logic 420 may also cause switch circuit 414 to connect electronic device 402B and electronic device 402D, such that content from electronic device 402B (e.g., a STB) is displayed on electronic device 402D (e.g., a TV).

In another example, switching device 404 may be configured to display content from a particular source device (e.g., a STB) on a plurality of sink devices (e.g., a TV and a projector). In this example, upon detection that a control device 424 associated with electronic device 402B is being used, control logic 420 may cause transmitter 432 to transmit control signal 434 to electronic device 402D (e.g., a TV), as well as a control signal 436 to electronic device 402E (e.g., a projector), causing both electronic devices 402D-402E to be powered on. Control logic 420 may also perform any number of actions in response to a determination that a particular RF remote control is being used, and is not limited to the illustrative examples described herein.

Figure 7:
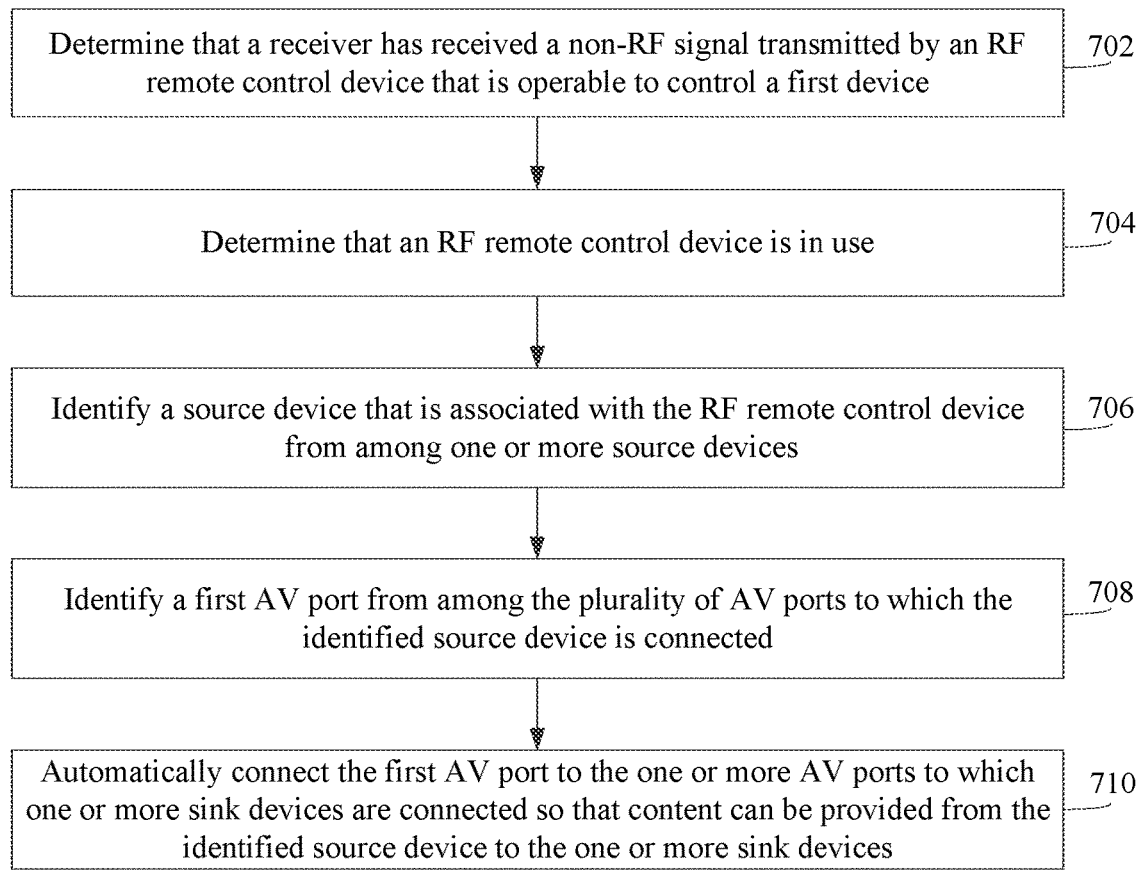
FIG. 7 depicts a flowchart of a method for automatically selecting an AV port based on a determination that an RF remote control device is being used in accordance with an embodiment.

In some example embodiments, one or more of operations 602, 604, and/or 606 of flowchart 600 may not be performed. Moreover, operations in addition to or in lieu of operations 602, 604, and/or 606 may be performed. Further, in some example embodiments, one or more of operations 602, 604, and/or 606 may be performed out of order, in an alternate sequence, or partially (or completely) concurrently with each other or with other operations 1. Automatic Port Selection Based on Determining that a Particular RF Remote Control Device is Being Used In accordance with embodiments disclosed herein, automatic port selection may be performed based on determining that a particular RF remote control device is being used in many ways. For instance, FIG. 7 depicts a flowchart 700 of a method performed by a switching device that performs automatic port selection based on determining that a particular RF remote control device is being used in accordance with an embodiment. The switching device may comprise a plurality of AV ports and a switch circuit that is operable to selectively connect any one of a plurality of source devices, each of which is connected to a corresponding one of the plurality of AV ports, to one or more sink devices that are connected to another one or more of the plurality of AV ports. The method of flowchart 700 may be implemented by system 400 as described above in reference to FIG. 4. Other structural and operational embodiments will be apparent to persons skilled in the relevant art(s) based on the following discussion regarding flowchart 700 and system 400.

Flowchart 700 begins with step 702. At step 702, a determination is made that a receiver has received a non-RF signal transmitted by an RF remote control device that is operable to control a first device. For example, with reference to FIG. 4, control logic 420 determines that receiver 430 has received a non-RF signal transmitted by an RF remote control device, such as control device 422 or 424. In the example shown in FIG. 4, control device 422 is operable to control electronic device 402A via RF signal 426A, while control device 424 is operable to control electronic device 402B via RF signal 428A. In response to a user interaction, control device 422 or 424 may transmit an RF signal and a non-RF signal. For instance, when a user interacts with control device 424, control device 424 may be programmed to transmit both an RF signal 428A to electronic device 402B (e.g., to power on STB 402B), as well as a non-RF signal (e.g., an IR signal) 428B to receiver 430. In an embodiment, non-RF signal 428B further includes a device identification code such that a receiving device can determine whether to ignore the non-RF signal.

In step 704, a determination is made that the RF remote control device is in use in response to the detection of the non-RF signal. In an embodiment, step 704 of FIG. 7 may be performed in a substantially similar manner as described above with reference to step 604 of FIG. 6.

In step 706, a source device that is associated with the remote control device is identified from among the one or more source devices. For example, with reference to FIG. 4, mapping component 418 may be configured to identify a source device from among the one or more source devices (e.g., electronic device 402A, electronic device 402B, or electronic device 402C) that is associated with control device 422 or 424. For example, once receiver 430 detects non-RF signal 426B or 428B, control logic 420 may locate a device identification code included within non-RF signal 426B or 428B. Mapping component 418 may determine, based on the device identification code corresponding to the received non-RF signal, the identity of the control device that transmitted the non-RF signal. In this manner, control logic 420 may determine that a particular RF remote associated with a source device (e.g., electronic device 402A) is being used.

In step 708, a first AV port from among the plurality of AV ports to which the identified source device is connected is identified. For example, with reference to FIG. 4, mapping component 418 may be configured to identify a first AV port from among the plurality of AV ports (e.g., AV ports 410A-410C) to which the identified source device is coupled based on the source device identified by control logic 420. By way of an illustrative example, if control logic 420 determines that electronic device 402A is being used in response to detecting non-RF signal 426B, control logic 420 may automatically determine that electronic device 402A (i.e., the identified source device) is connected to port 410A (i.e., a first AV port) from among the plurality of AV ports. In accordance with an embodiment, the AV ports are HDMI ports.

In step 710, the first AV port is automatically connected to the one or more AV ports to which one or more sink device are connected so that content can be provided from the identified source device to the one or more sink devices. For example, with reference to FIG. 4, switch circuit 414 may be configured to automatically connect the first AV port to the AV port to which one or more sink devices are connected. For example, if the first AV port is identified to be AV port 410A, and the sink device to be used for presentation of the content is electronic device 402D (e.g., a TV), then switch circuit 414 may automatically connect AV port 410A to AV port 410D. Switch circuit 414 may be configured to automatically connect the first AV port to the AV port to which the sink device is connected based control logic 420 and mapping component 418 determining that a control device associated with electronic device 410A transmitted a non-RF signal to receiver 430.

Embodiments, however, are not limited to presenting content on a single source device. For instance, switching device 404 may be configured to associate a particular source device with more than one sink device, such that content from the source device may be presented on more than one display. In an embodiment, for example, if the first AV port is identified to be AV port 410A, and electronic device 402D (e.g., a TV) and electronic device 402E (e.g., a projector) are both associated with the presentation of content from the first electronic device, then switch circuit 414 may automatically connect AV port 410A to AV ports 410D and 410E.

In some example embodiments, one or more of operations 702, 704, 706, 708, and/or 710 of flowchart 700 may not be performed. Moreover, operations in addition to or in lieu of operations 702, 704, 706, 708, and/or 710 may be performed. Further, in some example embodiments, one or more of operations 702, 704, 706, 708, and/or 710 may be performed out of order, in an alternate sequence, or partially (or completely) concurrently with each other or with other operations.

Figure 8:
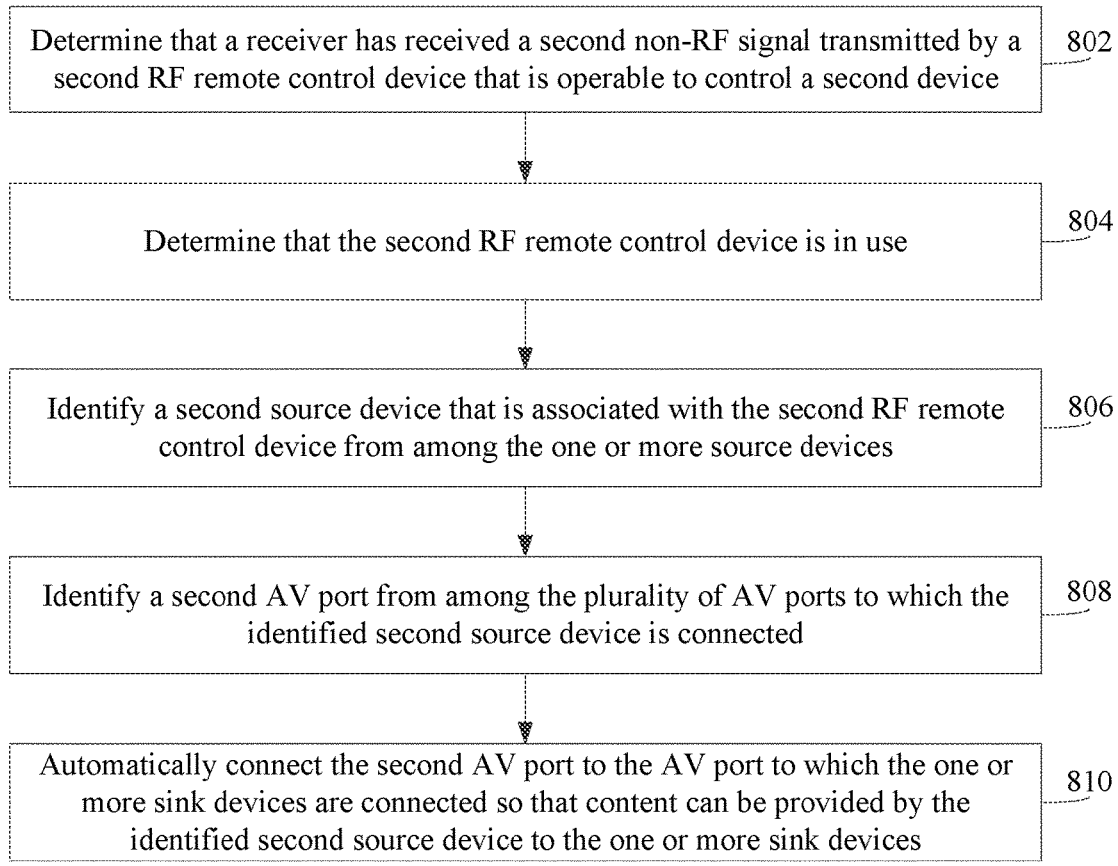
FIG. 8 depicts a flowchart of a method for automatically switching from a first AV port to a second AV port based on a determination that an RF remote control device is being used in accordance with an embodiment.

In accordance with an embodiment, switching device 404 may be further configured to automatically switch from the first AV port to a second AV port. For instance, FIG. 8 depicts a flowchart 800 of a method performed by a switching device that automatically switches from the first AV port to a second AV port in accordance with an embodiment. The method of flowchart 800 may be implemented by system 400 as described above in reference to FIG. 4. Other structural and operational embodiments will be apparent to persons skilled in the relevant art(s) based on the following discussion regarding flowchart 800 and system 400.

Flowchart 800 begins with step 802. At step 802, a determination is made that a receiver has received a second non-RF signal transmitted by a second RF remote control device that is operable to control a second device. In an embodiment, step 802 of FIG. 8 may be performed in a substantially similar manner as described above with reference to step 702 of FIG. 7. For instance, with reference to FIG. 4, control logic 420 may determine that receiver 430 previously received a first non-RF signal 426B corresponding to a first control device 422 operable to control a first electronic device 402A, and has subsequently received a second non-RF signal 428B corresponding to a second control device 424 operable to control a second electronic device 402B.

In step 804, a determination is made that the second RF remote control device is in use in response to the detection of the second non-RF signal. In an embodiment, step 804 of FIG. 8 may be performed in a substantially similar manner as described above with reference to step 604 of FIG. 6. For instance, in the illustrative example discussed with reference to FIGS. 4 and 8, control logic 420 may determine that a second control device 424 is in use in response to the detection of the second non-RF signal 428B.

In step 806, a source device that is associated with the second remote control device is identified from among the one or more source devices. In an embodiment, step 806 of FIG. 8 may be performed in a substantially similar manner as described above with reference to step 706 of FIG. 7. For example, with continued reference to FIG. 4 and the illustrative example described above with reference to FIG. 8, mapping component 418 may be configured to identify a second source device from among the one or more source devices (e.g., electronic device 402B) that is associated with the second control device 424. For example, once receiver 430 detects second non-RF signal 428B, control logic 420 may locate a device identification code included within the second non-RF signal 428B. Mapping component 418 may determine, based on the device identification code corresponding to second non-RF signal 428B, the identity of the second control device that transmitted the non-RF signal. In this manner, control logic 420 may determine that second control device 424 associated with a second source device (e.g., electronic device 402B) is being used.

In step 808, a second AV port from among the plurality of AV ports to which the identified second source device is connected is identified. For example, with reference to FIG. 4, mapping component 418 may be configured to identify a second AV port from among the plurality of AV ports (e.g., AV ports 410A-410C) to which the identified source device is coupled based on the source device identified by control logic 420. With continued reference to the illustrative example discussed above, if control logic 420 determines that a second electronic device 402B is being used in response to detecting the second non-RF signal 428B, control logic 420 may automatically determine that electronic device 402B (i.e., the identified second source device) is connected to port 410B (i.e., a second AV port) from among the plurality of AV ports.

In step 810, the second AV port is automatically connected to the one or more AV ports to which one or more sink device are connected so that content can be provided from the identified second source device to the one or more sink devices. For example, with reference to FIG. 4, switch circuit 414 may be configured to automatically connect the second AV port to the AV port to which one or more sink devices are connected. For example, if the second AV port is identified to be AV port 410B, and the sink device to be used for presentation of the content is electronic device 402E (e.g., a projector), then switch circuit 414 may automatically connect AV port 410B to AV port 410E. Switch circuit 414 may be configured to automatically connect the second AV port to the AV port to which the sink device is connected based control logic 420 and mapping component 418 determining that a second control device associated with second electronic device 410B transmitted a non-RF signal to receiver 430. In automatically connecting the second AV port to one or more AV ports to which one or more sink devices are connected, switch circuit may be configured to automatically disconnect any connection existing between a first AV port (e.g., port 410A) and one or more sink devices (e.g., electronic device 402D) associated with the first electronic device.

In some example embodiments, one or more of operations 802, 804, 806, 808, and/or 810 of flowchart 800 may not be performed. Moreover, operations in addition to or in lieu of operations 802, 804, 806, 808, and/or 810 may be performed. Further, in some example embodiments, one or more of operations 802, 804, 806, 808, and/or 810 may be performed out of order, in an alternate sequence, or partially (or completely) concurrently with each other or with other operations.

2. Automatic Control of a Source or Sink Device

Figure 9:
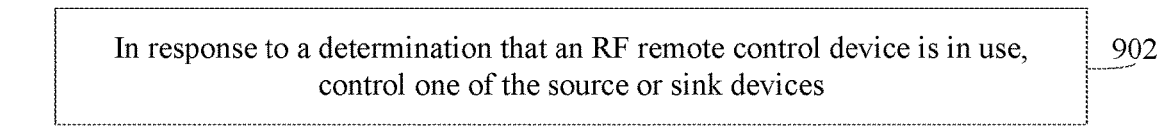
FIG. 9 depicts a flowchart of a method for controlling a source or sink device based on a determination that an RF remote control device is being used in accordance with an embodiment.

In accordance with embodiments disclosed herein, one or more source or sink devices may be controlled upon determining that an RF remote control device is being used in many ways. For instance, FIG. 9 depicts a flowchart 900 of a method performed by a switching device that performs automatic control of one or more source or sink devices based on determining that a particular RF remote device is being used in accordance with an embodiment. The switching device may comprise a plurality of AV ports and a switch circuit that is operable to selectively connect any one of a plurality of source devices, each of which is connected to a corresponding one of the plurality of AV ports, to one or more sink devices that are connected to another one or more of the plurality of AV ports. The method of flowchart 900 may be implemented by system 400 as described above in reference to FIG. 4. Other structural and operational embodiments will be apparent to persons skilled in the relevant art(s) based on the following discussion regarding flowchart 900 and system 400.

Flowchart 900 begins with step 902. In step 902, in response to a determination that a particular RF remote control device is in use, one of the one or more source devices or one of the one or more sink devices coupled to a switching device is automatically controlled. For instance, with reference to FIG. 4, electronic devices 402A-402C are source devices configured to provide audio and/or video signals and electronic devices 402D and 402E are sink devices configured to receive audio and/or video signals. As discussed above with reference to FIG. 4, control device 422 or 424 may be configured to control any one of the electronic devices 402A-402E via an RF signal. Also, as discussed above, control devices 422 or 424 may be programmed to transmit a non-RF signal that may be detected by receiver 430, thereby permitting control logic 420 to determine that a particular RF remote control device is being used.

In response control logic 420 determining that a particular RF remote control device is being used, control logic 420 may cause transmitter 432 to transmit a control signal to any one or more of source devices 402A-402C, or sink devices 402D-402E. As an example, upon detection of non-RF signal 428B, control logic 420 may determine that control device 424 is being used. Based on that determination, control logic 420, using mapping component 418, may automatically determine that a user is intending to view audio/video content from electronic device 402B, which is coupled to port 410B, on one or more designated sink devices. In this example, control logic 420 may cause transmitter 432 to transmit a control signal (not shown) to electronic device 402B connected to the identified source AV port to power on the device, and/or a separate control signal 434 or 436 to the one or more associated sink devices connected to the identified sink AV ports that causes the sink devices to be powered on.

In another embodiment, switching device 404 may be configured to manage the state of one or more electronic devices 402A-402E. For example, control logic 420 may cause transmitter 432 to transmit a control signal causing any non-used source and/or sink devices to be powered off based on a determination that a particular RF remote control device is being used. In an embodiment, when a remote control device associated with electronic device 402B (e.g., a STB) is being used, transmitter 432 may transmit one or more control signals to all other non-used source devices instructing the non-used source devices to be powered off. Similarly, transmitter 432 may automatically transmit a control signal 434 or 436 to any non-used sink devices instructing the non-used sink devices to be powered off. In this manner, because switching device 404 may be configured to manage the state of all source or sink devices, a user need not operate additional remote controls to manage the state of non-used source or sink devices.

In order to avoid a source or sink device from also acting on non-RF signals transmitted by control device 422 or 424, control device 422 or 424 may be programmed to transmit a non-RF signal comprising device identification codes that the source or sink devices are expected to ignore. For instance, where a system comprises a plurality control devices 422 and 424, each control device 422 and 424 may be programmed with a different device identification code. Mapping component 418 may associate each device identification code with a particular remote control device and/or source device. For example, control device 422 may be programmed to transmit non-RF signal 426B corresponding to a particular known but rarely used TV type, while control device 424 may be programmed to transmit non-RF signal 428B corresponding to a different known, but rarely used TV type. In this example, control logic 420 may be configured not to ignore either device identification codes. In this manner, when receiver 430 receives either non-RF signal 426B or 428B, control logic 420 may automatically determine which particular control device is being used based on the device identification code and mapping component 418. Based on the determination, control logic 420 may appropriately manage the state of one or more source devices or sink devices. In addition, because control devices 422 and 424 may be programmed to transmit non-RF signals comprising device identification codes corresponding to known but rarely used TV types, each of the source devices or sink devices coupled to switching device 404 may ignore the non-RF signals, thereby permitting switching device 404 full management of the state of the source or sink devices.

In accordance with embodiments, however, it is not necessary to program one or more of control devices 422 or 424 with device identification codes corresponding to known but rarely used TV types. Rather, control devices 422 or 424 may be programmed with any other device identification code that the source or sink devices are known to ignore. For instance, a smart HDMI switch (e.g., switching device 404) may automatically detect a type of TV (e.g. among other devices) that may be connected to the switch. Based on this detection, switching device may prompt a user, through user interface logic 442, to program an RF remote control device with a device identification code that the detected TV will ignore. In this manner, the smart HDMI switch can ensure that a non-conflicting device identification code is programmed into the RF remote control device, thereby minimizing the possibility that a source or sink device takes any action in response to non-RF signals transmitted by the RF remote control device.

As discussed above, however, control devices 422 or 424 may be programmed to transmit a non-RF signal comprising a device identification code that a source device or sink device coupled to switching device 404 does not ignore. In this illustrative scenario, a smart HDMI switch (e.g., switching device 404) may nevertheless be configured not to ignore the non-RF signals comprising the same device identification code. However, because the electronic device (e.g., TV 402D) is configured to act upon non-RF signals received by it, the smart HDMI switch need not transmit a control signal to the electronic device comprising the same instruction already received by the electronic device. Rather, upon detection of the non-RF signal comprising the device identification code, the smart HDMI switch may perform additional non-conflicting functions, such as controlling a port switching operation within switching device 404, controlling a source device, controlling additional functions of a sink device, controlling a separate sink device, or controlling any other electronic device.

In accordance with another embodiment, switching device 404 may determine a current power state of the source and/or sink device, for example by analyzing audio and/or video signals to/from the port connected to the source or sink device. In this event, switching device 404 may be determine whether the source and/or sink device is already powered on. In this manner, switching device 404 may avoid transmitting an unnecessary control signal to a source or sink device. If switching device 404 determines that the source device and/or sink device are not powered on upon determining that a particular RF remote control is being used, switching device 404 may provide a control signal 434 or control signal 436 to power on the device. Additional details regarding how the power state of an electronic device is determined may be found in U.S. patent application Ser. No. 14/945,201, filed on Nov. 18, 2015 and entitled "Automatic Detection of a Power Status of an Electronic Device and Control Schemes Based Thereon," the entirety of which is incorporated by reference.

Control of a source or sink device is not limited to the above examples in which a source or sink device is powered on or powered off upon determining that a particular RF remote control is being used. In accordance with other embodiments, control logic 420 may cause transmitter 432 to transmit any type of control signal to any one of a source or sink device. For instance, transmitter 432 may automatically transmit a control signal causing a change to an audio or video setting of a source or sink device. For instance, a control signal may instruct a source or sink device to change a video resolution. As another example, a control signal may instruct a source device to output an audio signal to a separate surround sound system instead of to a source device coupled to switching device 404. In another embodiment, transmitter 432 may automatically transmit a control signal causing a source or sink device to change a graphics mode (e.g., changing a sink device from a "movie" mode to a "game" mode) upon determining that a particular RF remote control device is being used. These examples are merely provided for illustrative purposes. In embodiments, a control signal may include any type of signal that causes a change in a state or setting of any one of a source or sink device upon determining that a particular RF remote control device is in use.

In embodiments, control signal 434 or 436 may be transmitted via any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.), and/or the like. In another embodiment, control signal 434 or 436 may be transmitted via a wired connection (e.g., via a Universal Serial Bus (USB) cable, a coaxial cable, IP-based communication technologies, etc.) or transmitted via a wireless connection (e.g., via IR communication) and/or the like.

3. Automatic Control of a Device that is Not a Source or Sink Device

Figure 10:
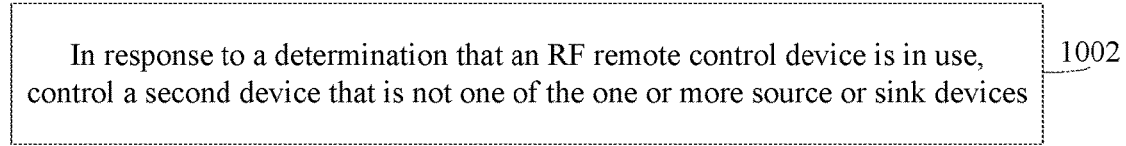
FIG. 10 depicts a flowchart of a method for controlling a device based on a determination that an RF remote control device is being used in accordance with an embodiment.

In accordance with embodiments disclosed herein, one or more additional devices that are not source or sink devices may be automatically controlled upon determining that an RF remote control device is being used in many ways. For instance, FIG. 10 depicts a flowchart 1000 of a method performed by a switching device that performs automatic control of a device that is neither a source or sink device in accordance with an embodiment. The method of flowchart 1000 may be implemented by system 400 as described above in reference to FIG. 4. Other structural and operational embodiments will be apparent to persons skilled in the relevant art(s) based on the following discussion regarding flowchart 1000 and system 400. Although described with reference to an exemplary system 400 of FIG. 4, the method of flowchart 1000 may be performed any suitable control device capable of receiving a non-RF signal from a remote control device, and transmitting a control signal to another device based on detection that the remote control device is being used.

Flowchart 1000 begins with step 1002. In step 1002, in response to a determination that a particular RF remote control device is in use, one or more devices that is not a source or sink device of the switching device may be automatically controlled. For instance, with reference to FIG. 4, electronic devices 402A-402C are source devices configured to provide audio and/or video signals and electronic devices 402D and 402E are sink devices configured to receive audio and/or video signals. As discussed above with reference to FIG. 4, control device 422 or 424 may be configured to control any one of the devices 402A-402E via an RF signal. Also as discussed above, control devices 422 or 424 may be programmed to transmit a non-RF signal that may be detected by receiver 430, thereby permitting control logic 420 to determine that a particular RF remote control device is being used.

In response control logic 420 determining that a particular RF remote control device is being used, control logic 420 may cause transmitter 432 to transmit a control signal 438 to an electronic device(s) 440 that is not one of the source devices or sink devices connected to the switching device 404. For instance, control logic 420 may be programmed to associate a particular source device (e.g., electronic device 402A which may be a Blu-ray player) with a predetermined viewing atmosphere (e.g., a low-light atmosphere). Accordingly, upon detection of non-RF signal 426B transmitted by control device 422, which is associated with electronic device 402A, control logic 420 may automatically control one or more additional devices, such as a light and/or a window shade. In this manner, a user interacting with a remote associated with a Blu-ray player need not manually operate any of the additional electronic devices.

In another embodiment, control signal 438 may comprise a signal to automatically control projection screen associated with a particular sink device (e.g., electronic device 402E). For instance, if switching device 404 is configured to cause a particular source device (e.g., electronic device 402A) to provide content to a projector (e.g., electronic device 402E), control signal 438 may transmit a signal to a motorized projection screen causing the screen to be lowered upon detection that an RF remote control device associated with electronic device 402A is being used.

In another embodiment, control signal 438 may comprise a signal to automatically control a thermostat upon detection that a particular RF remote control device is being used. For instance, a thermostat may be controlled to automatically lower or raise a temperature upon control logic 420 determining that a particular remote control device is in use.

In yet another embodiment, control signal 438 may comprise a signal to automatically control one or more functions of a smart phone or other portable electronic device. For example, upon determining that a particular RF remote control device is being used, control logic 420 may cause transmitter 432 to emit control signal 438 causing a smartphone to change a ringer setting. For instance, a smart phone may be automatically controlled to operate in a reduced volume or silenced mode. In another embodiment, a smart phone may be automatically controlled to operate in a "do-not-disturb" mode. These examples, however, are only illustrative. Any other feature or function of a smart phone may be automatically controlled upon determining that a particular remote control device is being used.

In yet another embodiment, control signal 438 may comprise a signal to automatically control an audio system, such as a surround sound system, based on a determination that a particular RF remote control device is being used. For instance, control logic 420 may be configured to automatically cause transmitter 432 to transmit a control signal 438 causing a surround sound system to be powered on, powered off, raise or lower a volume, and/or change a surround sound mode.

In embodiments, control signal 438 may be transmitted via any suitable type of RF communication, wired connection, or wireless connection, in a similar manner as described above with reference to FIG. 9. Control signal 438 may also comprise a signal to control any other type of electronic device(s) 440, such as a home automation device or any other type of device capable of receiving a control signal. The automatic control of electronic device(s) 440 described above are provided for illustrative purposes only, and are not intended to be limited in any way.

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, IR and other wireless media. Example embodiments are also directed to such communication media.

The remote control activity detection embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 11:
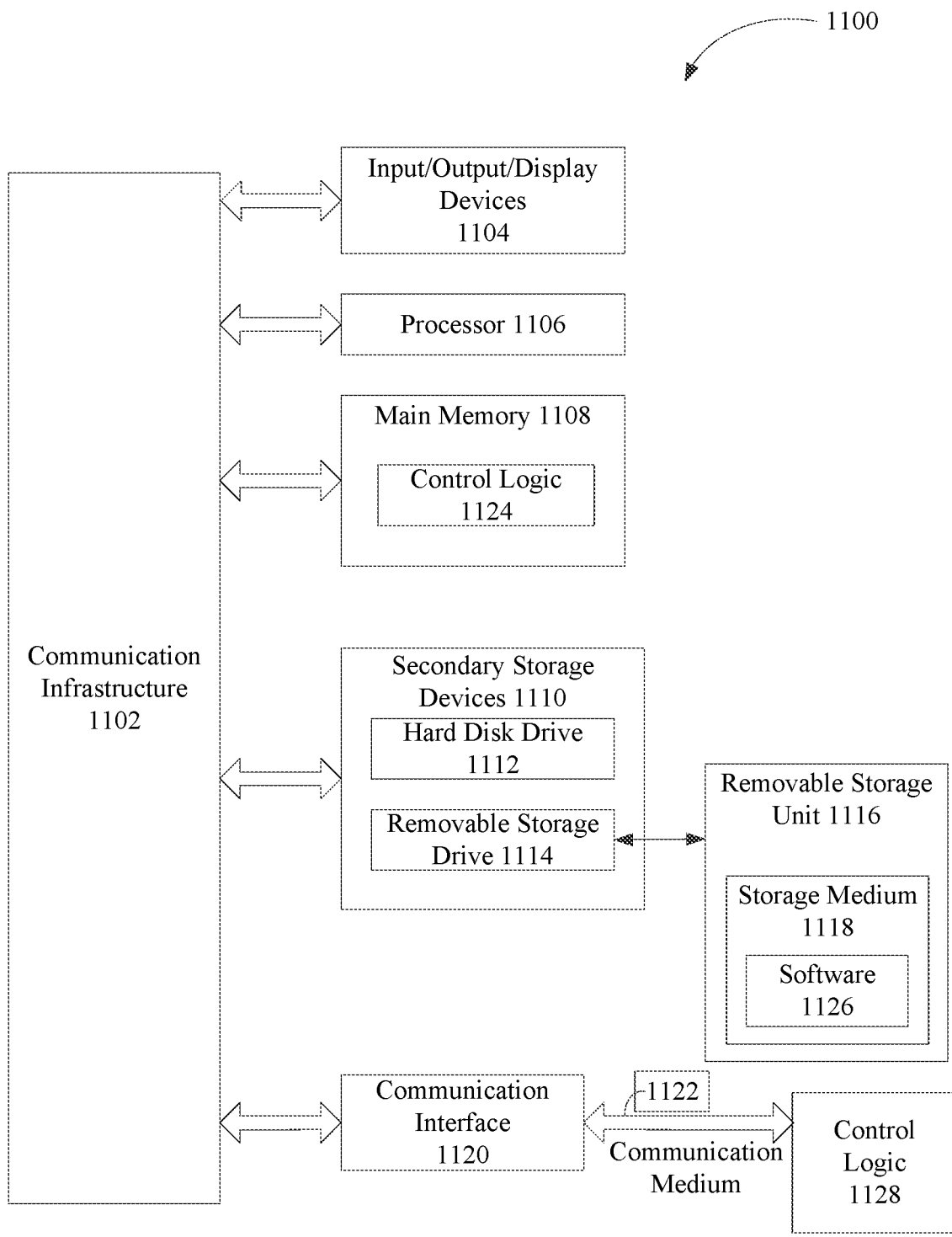
FIG. 11 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1100 shown in FIG. 11. It should be noted that computer 1100 may represent communication devices, processing devices, servers, and/or traditional computers in one or more embodiments. For example, electronic devices 102A-102C, electronic devices 302A and 302B, electronic devices 402A-402E, electronic device(s) 440 (as described above in reference to FIGS. 1, 3, 4), control device 106, control device 422, control device 424, control device 502 (as described above in reference to FIGS. 1, 4, and 5), switching device 104, switching device 204, switching device 304, switching device 404 (as described above in reference to FIGS. 1-4, respectively), or any of the subsystems, components or sub-components respectively contained therein, may be implemented using one or more computers 1100.

Computer 1100 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1100 may be any type of computer, including a desktop computer, a server, etc.

Computer 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads.

Computer 1100 also includes a primary or main memory 1108, such as random access memory (RAM). Main memory 1108 has stored therein control logic 1124 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disk, DVD, optical storage disk, or any other computer data storage device. Removable storage drive 1114 reads from and/or writes to removable storage unit 1116 in a well-known manner.

Computer 1100 also includes input/output/display devices 1104, such as touchscreens, LED and LCD displays, monitors, keyboards, pointing devices, etc.

Computer 1100 further includes a communication or network interface 1120. Communication interface 1120 enables computer 1100 to communicate with remote devices. For example, communication interface 1120 allows computer 1100 to communicate over communication networks or mediums 1122 (representing a form of a computer useable or readable medium), such as LANs, WANs, the Internet, etc. Network interface 1120 may interface with remote sites or networks via wired or wireless connections.

Control logic 1128 may be transmitted to and from computer 1100 via the communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A switching device for controlling another device, the system comprising:
    a receiver;
    a transmitter; and
    control logic that is operable to:
        determine that the receiver has received an infrared (IR) signal transmitted by a radio-frequency (RF) remote control device that is operable to control a first device that is different from the switching device among one or more source devices or one or more sink devices, the IR signal comprising information that indicates to the first device and a second device that is different from the first device that the IR signal should be ignored and information that indicates to the switching device that the IR signal should not be ignored, wherein the RF remote control device is programmed to transmit the IR signal in response to a user interaction with the RF remote control device;
        in response to determining that the receiver has received the IR signal, determine that the RF remote control device is in use; and
        in response to determining that the RF remote control device is in use, cause the transmitter to transmit a control signal to control the second device.

2. The switching device of claim 1, wherein the second device comprises one of the one or more sink devices that is not the first device, and
    wherein the control signal comprises a signal to power on the second device.

3. The switching device of claim 1, wherein the second device comprises one of the one or more source device that is not the first device, and
wherein the control signal comprises a signal to power off the second device.

4. The switching device of claim 1, wherein the control signal comprises a signal to change an audio or video setting of the second device.

5. The switching device of claim 1, wherein the second device comprises one of:
a light;
a window shade;
a projection screen;
a thermostat;
a smart phone; or
a surround sound system.

6. The switching device of claim 1, wherein the information that indicates to the first device that the IR signal should be ignored comprises a device identification code that indicates to the first device that the IR signal should be ignored.

7. The switching device of claim 1, wherein the control logic is part of an audio/video switch;
wherein the first device comprises a set-top box; and
wherein the second device comprises a television.

8. A method of controlling a device, the method comprising:
detecting, by a switching device, an infrared (IR) signal transmitted by a radio-frequency (RF) remote control device that is operable to control a first device that is different from the switching device among one or more source devices or one or more sink devices, the IR signal comprising information that indicates to the first device and a second device that is different from the first device that the IR signal should be ignored and information that indicates to the switching device that the IR signal should not be ignored, wherein the RF remote control device is programmed to transmit the IR signal in response to a user interaction with the RF remote control device;
in response to the detection of the IR signal, determining that the RF remote control device is in use; and
in response to determining that the RF remote control device is in use, transmitting a control signal to control the second device.

9. The method of claim 8, wherein the second device comprises one of the one or more sink devices that is not the first device, and
wherein the control signal comprises a signal to power on the second device.

10. The method of claim 8, wherein the second device comprises one of the one or more source device that is not the first device, and
wherein the control signal comprises a signal to power off the second device.

11. The method of claim 8, wherein the control signal comprises a signal to change an audio or video setting of the second device.

12. The method of claim 8, wherein the second device comprises one of:
a light;
a window shade;
a projection screen;
a thermostat;
a smart phone; or
a surround sound system.

13. The method of claim 8, wherein the information that indicates to the first device that the IR signal should be ignored comprises a device identification code that indicates to the first device that the IR signal should be ignored.

14. The method of claim 8, wherein the transmitting the control signal comprises transmitting the control signal over one of an RF signal, an infrared signal, or an internet protocol (IP) signal.

15. A switching device comprising:
a receiver;
a transmitter; and
control logic that is operable to:
determine that the receiver has received an infrared signal transmitted by a radio-frequency (RF) remote control device, the IR signal comprising a signal that is also received by a first device to perform a first function on the first device among one or more source devices or one or more sink devices, the IR signal comprising information that indicates to the first device and the switching device that the IR signal should not be ignored, wherein the RF remote control device is programmed to transmit the IR signal in response to a user interaction with the RF remote control device;
in response to determining that the receiver has received the IR signal, determine that the RF remote control device is in use; and
in response to determining that the RF remote control device is in use, cause the transmitter to transmit a second signal that is not the same as the IR signal to the first device, the second signal comprising a signal to perform an additional function on the first device that does not conflict with the first function.

16. The switching device of claim 15, wherein the control logic is configured to identify a source device from among the one or more source devices that is associated with the RF remote control device by:
detecting a device identification code included in the IR signal that identifies the source device; and
associating the device identification code included in the IR signal with the source device.

17. The switching device of claim 15, wherein the control logic is further configured to determine a power state of the first device, and
wherein the control signal comprises a signal to power on the first device.

18. The switching device of claim 15, wherein the control logic is configured to determine the power state of the first device by analyzing an audio or video signal of the first device.

19. The switching device of claim 15, wherein the control signal comprises a signal to change an audio or video setting of the first device.

20. The switching device of claim 15, wherein the control logic is further configured to cause the transmitter to transmit a control signal to a second device.

* * * * *